Sept. 1, 1959
J. B. LOCKERT
2,901,857
TROLLING LINE FLOAT
Filed May 5, 1958
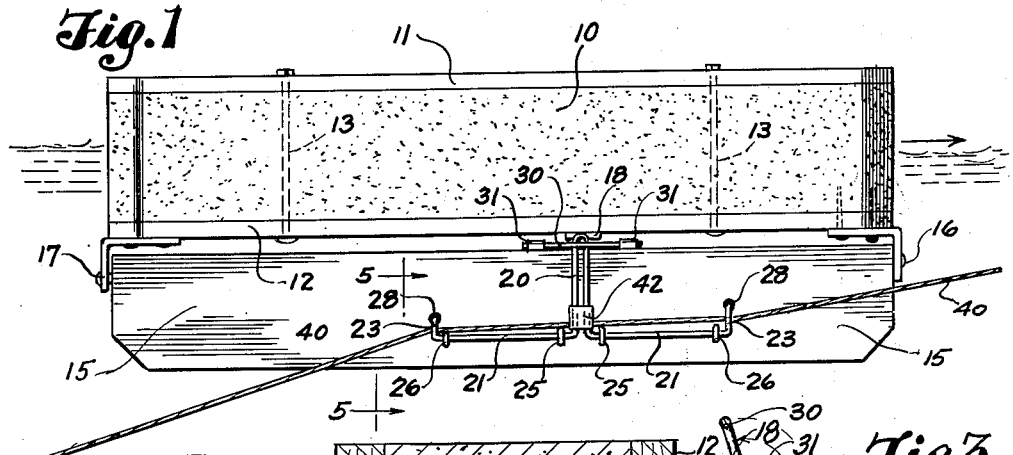
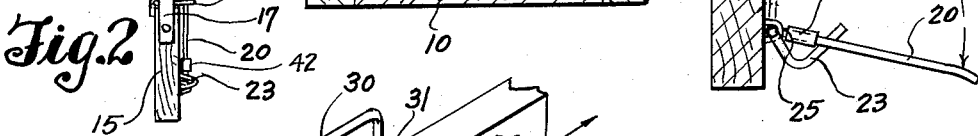
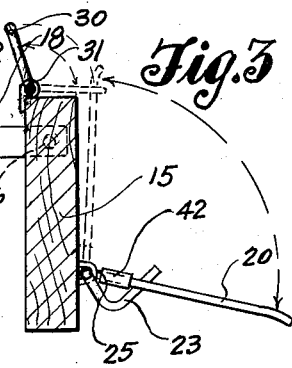
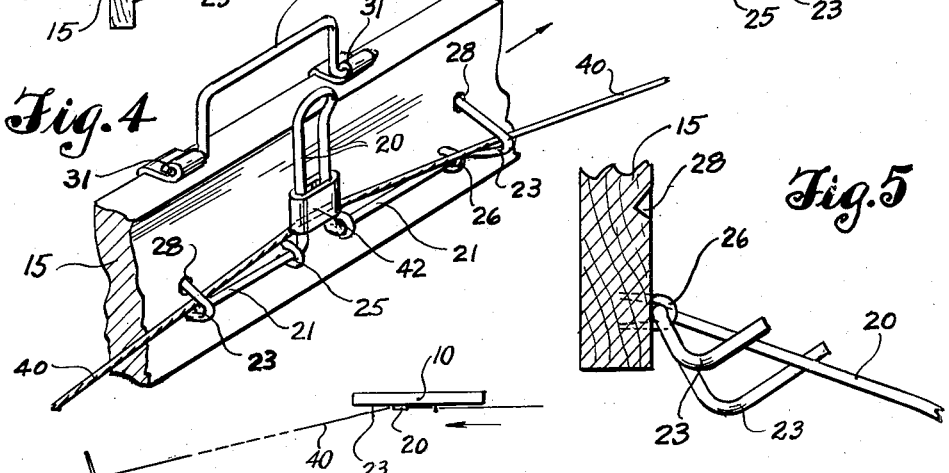
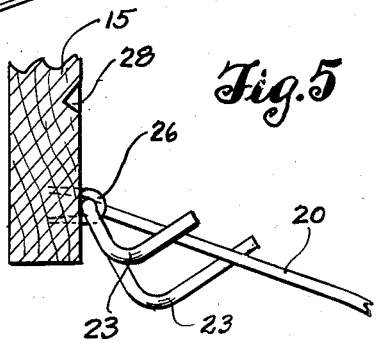
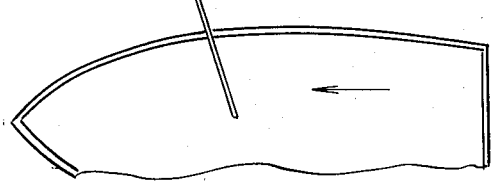
INVENTOR.
JENS B. LOCKERT
BY
Robinson & Berry
ATTORNEYS

United States Patent Office 2,901,857
Patented Sept. 1, 1959

2,901,857

TROLLING LINE FLOAT

Jens B. Lockert, Gig Harbor, Wash.

Application May 5, 1958, Serial No. 733,207

6 Claims. (Cl. 43—43.13)

This invention relates to floats and has reference more particularly to a device that is known by those in the industry to which it pertains, as a "trolling line float."

More specifically stated, the present invention is an improved form of float that may be applied to a trolling line, as extended, for example, from a fishing boat, to support the line and thus set the lure at a desired depth below the surface; the present invention being in the nature of an improvement upon that type of float as disclosed and claimed in my United States Patent No. 2,226,004, issued December 24, 1940.

It is the principal object of the present invention to provide a trolling line float comprising a float body of such displacement as to adequately support the trolling line without depending on any sledding action, and to the underside of which float a keel-like plate is hingedly attached and to which plate a trolling line clamp, like or similar to that disclosed in my above mentioned prior patent, is applied; the line clamp being so arranged that it cannot become accidentally released while the float is in its normal position of use in the water.

It is also an object of the present invention to provide a float embodying the hingedly joined parts as above stated, wherein the line clamp is locked against release by a latch member carried on the keel plate and held in place by the float but which is readily disengageable from the clamp lever upon turning the keel plate on its hingle mountings to an angular position relative to the bottom surface of the float body.

Still another object of the present invention is to provide a float, and to equip it with a line clamp that can readily be released and then positioned to receive the line when the float is out of the water, or for removal of the line therefrom, but which will not accidentally assume such position relative to the float that the clamp may be released so long as the float is disposed in position of use in the water.

Further objects and advantages of the present invention reside in the details of construction of the parts embodied in the float; in the combination with the float and keel plate of the line clamp, and in the mode of use of the float in a trolling operation.

In accomplishing the above mentioned and other objects of the invention, I have provided the improved details of construction, the preferred forms of which are illustrated in the accompanying drawings, wherein:

Fig. 1 is a side view of the present float as normally positioned in the water, and as clamped to a trolling line.

Fig. 2 is an end view of the float.

Fig. 3 is an enlarged cross-sectional view, taken in the vertical plane of the clamping lever, showing the hingedly joined body and the keel plate as adjusted to that angular relationship that permits release and opening of the line clamp lever for the placing of the line therein or for its removal therefrom.

Fig. 4 is a perspective view showing the line clamping lever and its latch, and also showing the line guiding loops and their connection with the lever.

Fig. 5 is an enlarged cross-sectional detail taken on line 5—5 in Fig. 1.

Fig. 6 is a plan view, schematically illustrating the use of a float in a trolling operation.

Referring more in detail to the drawings:

The present float body comprises an elongated block 10 of a suitable buoyant material, such as foam plastic, or the like, preferably of the rectangular cross-sectional form in which it is shown in Fig. 2. In a float presently being made, the block 10 is approximately 27 inches long, 3½ inches wide and about 4 inches deep, and it is disposed between wooden plates 11 and 12 that are disposed flatly against its top and under surfaces, and are joined together by bolts 13 extended vertically through the parts at opposite ends of the float as has been shown in Fig. 1.

It is to be understood, that the above given dimensions for the float body are not critical and might be more or less without departing from the spirit of the invention.

Extending along the underside of the float in a vertical plane midway of its opposite sides is a plate 15 which will herein be referred to as the "keel-plate." This plate may be of wood or other suitable material and is coextensive with the float body 10 and it is hinged thereto by hinge members 16 and 17 at the forward and rearward ends of the float. These hinge members normally retain the keel plate 15 in the vertical plane of the axial center line of the float body, with its top edge slightly spaced from the body as shown in Fig. 1, but permits it to be swung about its hinge axis to a position at an angle to the float body, that is, the float body 10 and plate 15 when out of the water may be adjusted to the angular relationship in which they are shown in Fig. 3. The hinging movement of plate 15 however, is permitted only toward one side of the body 10 by reason of a stop block 18 that is fixed to the under surface of the plate 12, as shown in Figs. 2 and 3, and with which the clamp lever engages, as will presently be explained.

The line clamp herein employed is substantially like that of my prior patent in that it is formed from a single rod or piece of stiff spring wire that is bent in such manner as to provide a line clamping lever portion 20 between the oppositely extending straight and axially aligned rod mounting portions 21—21, which terminate at their outer ends in laterally extending and arcuately curved or angularly formed line guiding loops 23—23. This line clamp is mounted on a side of the keel plate 15 as has been shown best in Figs. 1 and 4, with the mounting portions 21—21 parallel to and closely adjacent the lower edge of the keel plate and the lever arm 20 and line guiding loops 23—23 extending upwardly therefrom. Attachment of the clamp rod to the keel plate is by means of staples 25 and 26 applied over the inner and outer end portions of aligned parts 21—21 and clinched in the rudder plate. This mounting means permits the clamp lever, and line guides 23—23, to be swung from upwardly directed, closed positions against the keel plate as seen in Fig. 4, to open positions extending outwardly therefrom as in Fig. 5. When in their closed positions, the ends of the parts that form the line guiding loops 23—23 enter sockets 28 in the keel plate as seen in Fig. 4, and thus close the open sides of the loop.

It is further to be understood that when the clamp lever 20 is locked in line clamping position it lies closely against the face of the keel plate, and will securely clamp and hold a trolling line passing beneath it as seen in Fig. 1. The outer or swinging end of the clamping lever, when in line clamping position, extends slightly above the top edge of the keel plate and at that end is just slightly outwardly curved, and is then in position to receive a latch loop 30 thereover to secure it against release. The latchloop 30, here used is of U-form and has its leg portions extended across the top edge of the keel plate to near the side opposite the lever 20, and hinged at their ends, as at 31, to the plate. When the latch 30 is applied over the upper end of the latch lever, as shown in Fig. 2, and the float body 10 and keel plate 15 are in the normal position of use in the water, for example, as shown in Figs. 1 and 2, the upper end of the lever will be closely adjacent or engaged against the underside of the float body and the latch cannot then be disengaged therefrom. However, when the float is out of the water and the float body 10 is moved to a position relative thereto, such as that in which it is shown in Fig. 3, the latch can then be disengaged from the clamp lever and the lever swung to open position as in Fig. 3.

To apply a line to the float, the float is removed from the water and the body and keel plate are adjusted to the angular relationship shown in Fig. 3, the latch released and the lever 20 swung to an open position. The trolling line herein designated by numeral 40, is then placed beneath the clamp lever 20 near its lower end and also laid in the line guide loops 23—23. Then the lever 20 is swung to clamping position and is secured by latch loop 30. It is preferred that the latch lever 20 be equipped at its line engaging position, which is near its lower end, with a friction collar, as at 42, of copper or other suitable material.

When the float with line 40 so clamped therein is placed in the water it automatically assumes the upright position of Fig. 2 and is retained in that position by the downward pull of the lure equipped end of the line 40. By properly locating the float on the line, the lure can be supported at the fishing depth desired.

It is also to be understood that the line guide loop 23 which is at the trailing end of the float will hold the line quite close to the keel plate but that at the forward end of the float projects outwardly from the side of the plate to a greater extent, as will be understood by reference to Fig. 4, and therefore in towing the float in a trolling operation as illustrated in Fig. 6, with the clamp on that side of the keel plate that is facing the line of travel of the boat, the float will be permitted to angle outwardly from the trolling line and move outwardly from the line of travel. The longer the line from float to boat, the farther out from the line of travel the float will go. This is an advantage that will be recognized by persons familiar with the fishing industry.

It is preferred that the line clamp 20 be placed forward of the center of the float. Also, it is to be explained that in order to adapt floats for towing at opposite sides of a fishing boat, as illustrated in Fig. 6, it is required that some floats be equipped with the clamps in the right side and others be equipped with the clamp on the left side.

Such floats are serviceable; practical in use; light in weight and may be easily and readily attached to the trolling line or removed therefrom. Floats may be made in various sizes according to requirements, and made of various suitable materials.

What I claim as new is:

1. A trolling line float comprising an elongated buoyant body, a keel plate hingedly fixed to the underside of said buoyant body lengthwise thereof, and a line clamping means mounted on one side surface of said keel plate; said keel plate being hinged to swing laterally in one direction only, about a longitudinal axial line near its top edge, from a normal vertical position to an angular position relative to said body, said clamping means including a line clamping lever directed vertically across said keel plate and hinged thereto at its lower end, and adapted to be swung outwardly from the plate to receive a trolling line between said clamping lever and said keel plate and to be swung toward the plate to clamp and secure the line, and a latch member hinged to the top portion of said keel plate and adapted, when said keel plate has been adjusted to said angular relationship to said body to be disengaged from and also functionally applied to said clamp lever, and to be held against release from said lever by its engagement with the under surface of said body when said body and keel plate are in normal relationship to each other.

2. The combination recited in claim 1 wherein a line guiding loop is applied to the forward end of the keel plate and is movable to and from line receiving and retaining position with the movement of said lever to and from line clamping position.

3. The combination recited in claim 1 including line guiding loops adjacent said keel plate at positions forwardly and rearwardly of the line clamping lever and movable to and from their line receiving and retaining positions with the movement of said line clamping lever from clamping to releasing position.

4. The combination recited in claim 1 wherein line guiding loops are associated with said line clamping lever arm and are located forwardly and rearwardly thereof; said line guiding loops each having an open side adjacent said keel plate, and said loops being fixed relative to said lever arm whereby they are caused to swing therewith between positions closed against and away from the keel plate with the swinging of said clamping lever between clamping and line releasing positions.

5. The combination recited in claim 4 wherein one of said line guiding loops is located near the forward end of the keel plate and extends outwardly from the keel surface a distance that permits the forward end of the keel plate to angle outwardly away from the towing portion of the line as the float is drawn thereby through the water.

6. The combination recited in claim 5 wherein said line clamping lever and said line guiding loops are joined together to swing in unison about a common axial line with the swinging of said line clamping lever, and wherein the face of the keel plate is formed with sockets aligned with the loops, and each of said loops has an open side, and is adapted to swing into and from the corresponding socket with the swinging of the clamping lever from released to clamping position thus to close and open the loop.

References Cited in the file of this patent

UNITED STATES PATENTS 2,226,004     Lockert                Dec. 24, 1940
2,595,947     Jones                  May 6, 1952